Aug. 9, 1960     J. L. GRATZMULLER     2,948,266
FLUID PRESSURE MOTOR
Filed March 18, 1958     3 Sheets-Sheet 1

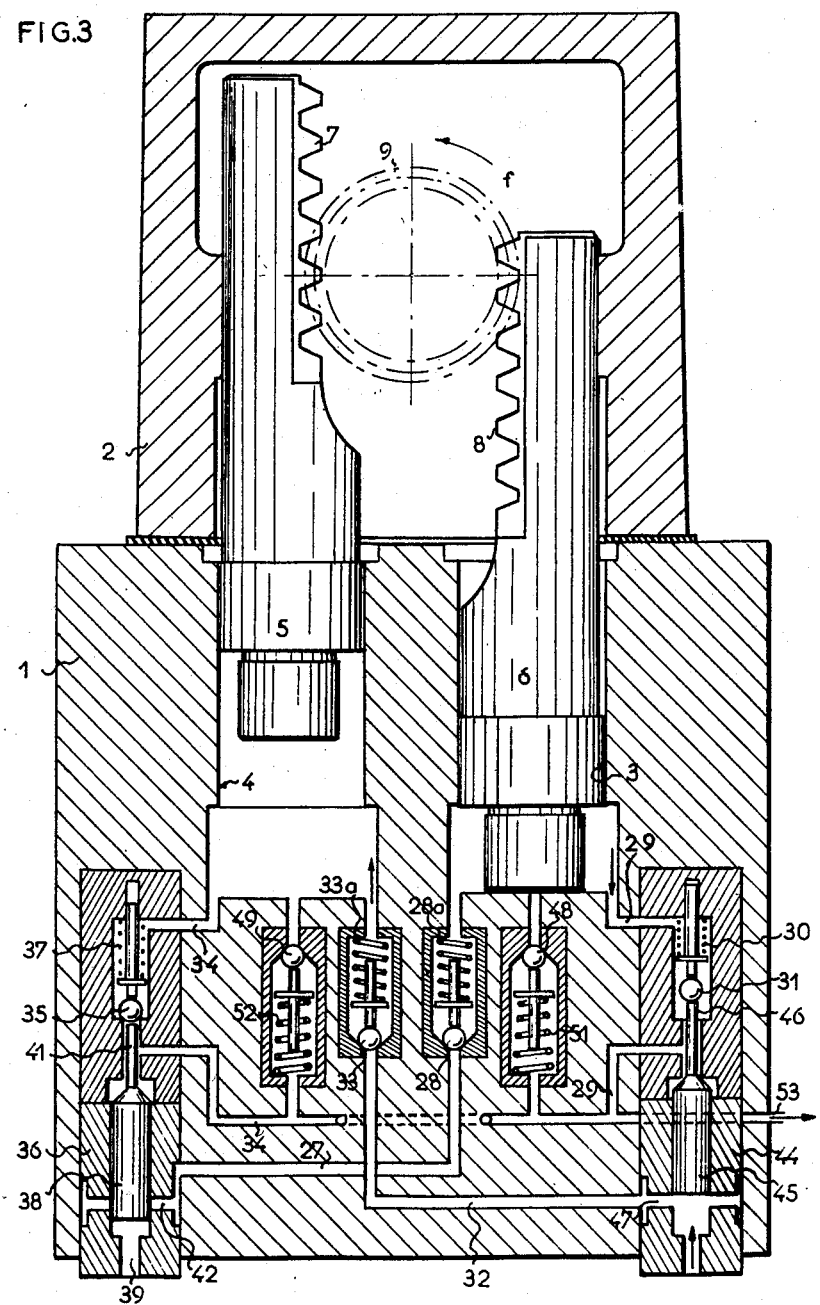

United States Patent Office 2,948,266
Patented Aug. 9, 1960

2,948,266

FLUID PRESSURE MOTOR

Jean Louis Gratzmuller, 66 Blvd. Maurice Barres, Neuilly-sur-Seine, France

Filed Mar. 18, 1958, Ser. No. 722,206

Claims priority, application France Mar. 29, 1957

2 Claims. (Cl. 121—120)

This invention relates to a fluid-pressure actuated engine adapted to reciprocate a member between two positions.

When such a device is adapted to be set up, for instance in the open air, or more generally in an atmosphere liable to exert detrimental effects upon it, it is desirable to arrange the whole assembly within a space altogether closed in order to provide for protection of its component members against said detrimental effects.

If the take-off is effected on one member of the device such as a reciprocating piston rod, the inward strokes of this member, in the long run, bring into the device undesirable foreign matter from outside, while a portion of the rod runs the risk of getting corroded.

The same would be also true of every intermediate element in the device (toothed racks, connecting rods, links, etc.) likely to move out of the device in a reciprocating movement.

One object of the invention is to provide a fluid-pressure actuated engine housed within an altogether closed box, the only members extending out of said box being a shaft to which a reciprocating angular movement is imparted which constitutes the take-off member, and the fittings for pipes adapted to lead fluid to and from the engine, all the members provided for rotating the shaft housed within the box.

Under such conditions, a satisfactory sealing between the rotary shaft and the box may be easily obtained by means of a packing device of any suitable conventional type, so that the movement of the shaft will never tend to carry along atmospheric foreign matters, moisture, etc., into the box.

According to another object of the invention, the rotary shaft is actuated by means of two pressure fluid cylinders acting in opposition upon said shaft.

A further object of the invention is to provide an engine of this type, wherein both cylinders have equal cross section areas and equal instantaneous speeds.

Under such conditions, the increase of the volume of each cylinder, in a given length of time, is equal to the decrease of the volume of the other cylinder, during the same length of time, so that the total volume of both cylinders inside the box remains constant. The result is that the volume of the free space within the box, which is equal to the difference between the capacity of the latter and the total volume occupied by the mechanical members enclosed therein, also remains constant. Consequently, the operation of the cylinders has no influence upon the pressure prevailing in this free space and, if care is taken that this pressure be substantially equal to the pressure outside the box, both pressures on either side of the stuffing box will remain substantially equal.

This arrangement offers the further advantage of preventing any foreign matter from entering the box.

It is another object of the invention to ensure the reciprocating rotary movement of the shaft by means of two single-acting cylinders parallel to each other and the pistons of which actuate two parallel toothed racks in mesh with a pinion rigidly secured to the shaft between said two racks. This arrangement makes it possible to reduce the overall dimensions of the device to a minimum.

Still a further object of the invention is to use the aforesaid racks as piston rods. Said racks, therefore, extend into the cylinders, thus reducing to a minimum the overall dimensions of the device in the direction of the cylinder axes.

In a particularly advantageous embodiment, the racks are guided in slideways of aluminum alloy, or any other non-seizing metal, and the end of the rotary shaft is journalled in bearings also of the same sort of material.

It is a particular object of the invention to design the engine box in two parts, namely: an aluminum casing which itself embodies the slideways and bearings, and a steel block secured to said casing and in which are the bores which constitute the cylinders.

Yet another object of the invention is to arrange inside said steel block the various obturating members which are necessary for controlling the selective actuation of the cylinders and, if need be, of auxiliary effects, such as locking of said cylinders in predetermined positions.

Such an arrangement provides a suitable sealing and protection of the aforesaid obturating members, and has furthermore the advantage of making the device according to the invention, entirely self-contained.

It is particularly desirable to use as obturating members, the devices described in the patent application No. 647,348 filed by the applicant on March 20, 1957, for "Hydraulic Device for Interlocking Two Hydraulic Jacks."

It has already been stated hereinabove, that in a preferred embodiment of the invention, the pressure inside the engine box is substantially constant. Obviously, this implies that the temperature is constant. Conversely, if the temperature, for instance the outer temperature, undergoes strong fluctuations and, in particular, if the box contains grease, thermal expansions are likely to bring about excessive pressure increase.

In order to do away with this drawback, according to another object of the invention, the enclosed device is fitted with an overload pressure valve permitting fluid to flow outwardly only.

It should be noted that such a valve does not require great precision and, therefore, it may be designed very simply, at a low cost.

Other objects and advantages of the invention will be apparent from the following detailed description, together with the accompanying drawings submitted for purpose of illustration only and not intended to limit the scope of the invention, reference being had for that purpose to the sub-joined claims.

In these drawings:

Fig. 3 is a view similar to that of Fig. 1 and diagrammatically shows the hydraulic circuits of the device.

Figure 1:
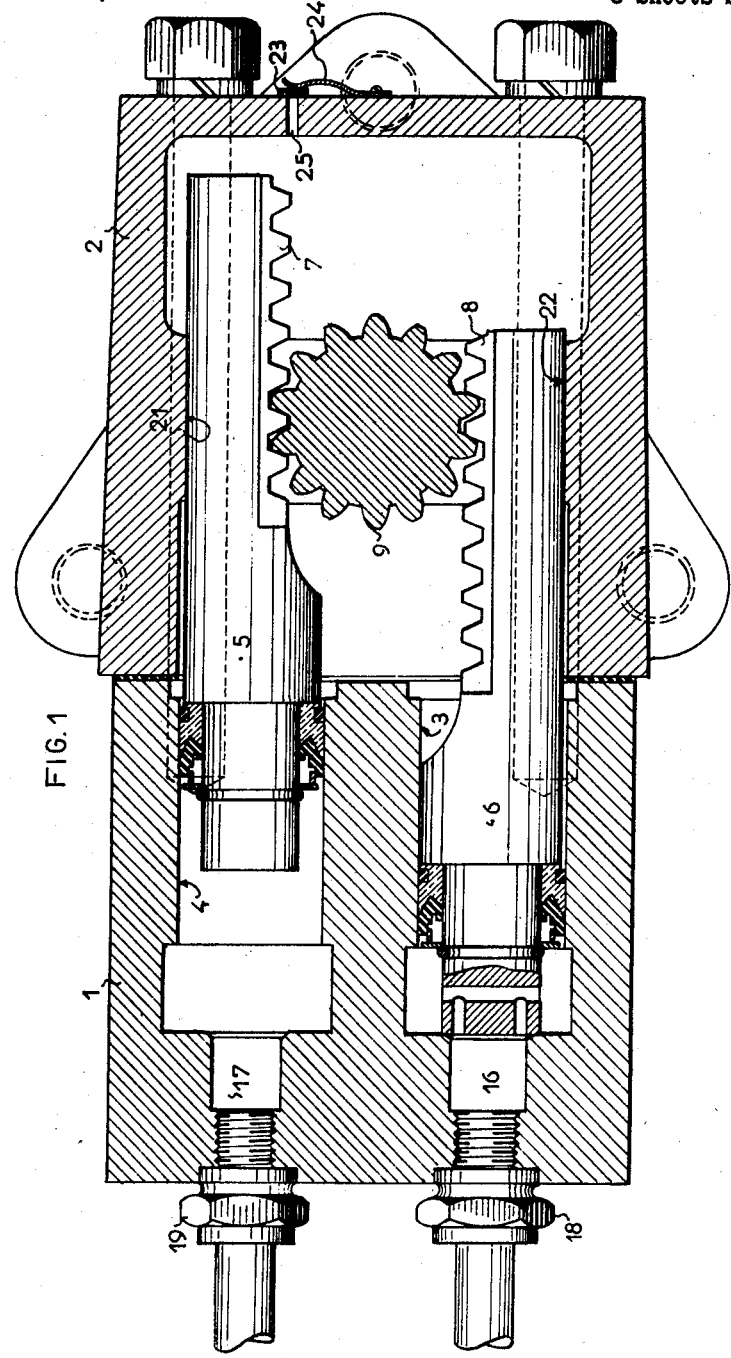
Fig. 1 is a longitudinal sectional view of a fluid-pressure actuated engine according to the invention.

The fluid-pressure actuated engine represented in the drawings essentially comprises a steel block 1 (Figs. 1 and 2) onto which is secured on aluminum casing 2. Two parallel bores 3 and 4 provided within the block 1 constitute two single-acting pressure fluid cylinders the pistons 5 and 6 of which are carried by toothed racks 7 and 8, respectively. The racks 7 and 8 are arranged on either side of a pinion 9 which they engage at two diametrically opposite points. The pinion is rigid with a driven shaft 11 journalled in bearings 12 and 13 formed by portions of the casing 2. Furthermore, the shaft 11 extends out of the casing 2 through a seal 14 of any suitable conventional type. The outer portion 15 of the shaft 11 constitutes the power take-off member of the device. The cylinders 3 and 4 communicate with the outside through ports 16 and 17 respectively, which communicate in turn, with fittings 18 and 19 on which may be branched inlet and outlet pipes (not shown). The racks 7 and 8 are guided in slideways 21, 22 constituted by portions of the aluminum casing 2.

The supply and discharge system for the cylinders 3 and 4 should be so arranged as to ensure simultaneously the introduction into one of the cylinders of the amount of fluid necessary for effecting one of the angular strokes of the shaft 11 and the discharge of an equal amount of fluid out of the other cylinder. A suitable switching device, then, interchanges the functions of the cylinders, the second cylinder receiving, in turn, the amount of fluid necessary for effecting the reverse angular stroke of the shaft 11 while the first cylinder now expels an equal amount of fluid.

Since the kinematic connection between the movable assemblies of the cylinders assured by the common pinion 9 is direct, since the strokes of both pistons are equal, and since the cross-section of the cylinders has a constant area, the sum of the variable capacities of the active compartments of said cylinders is constant, and so is the volume of the free space within the casing, said volume being equal to the difference between the volume of the hollow body comprising the inner spaces of the casing and of the block, on the one hand, and the sum of the volume of both rack-pistons, of the pinion, of the inner portion of the shaft 11 and of the whole constant capacity of both cylinders, on the other hand.

Under such conditions, at any given temperature, and in case no leak occurs around the pistons 5 and 6, the pressure in said free space is constant.

Figure 2:
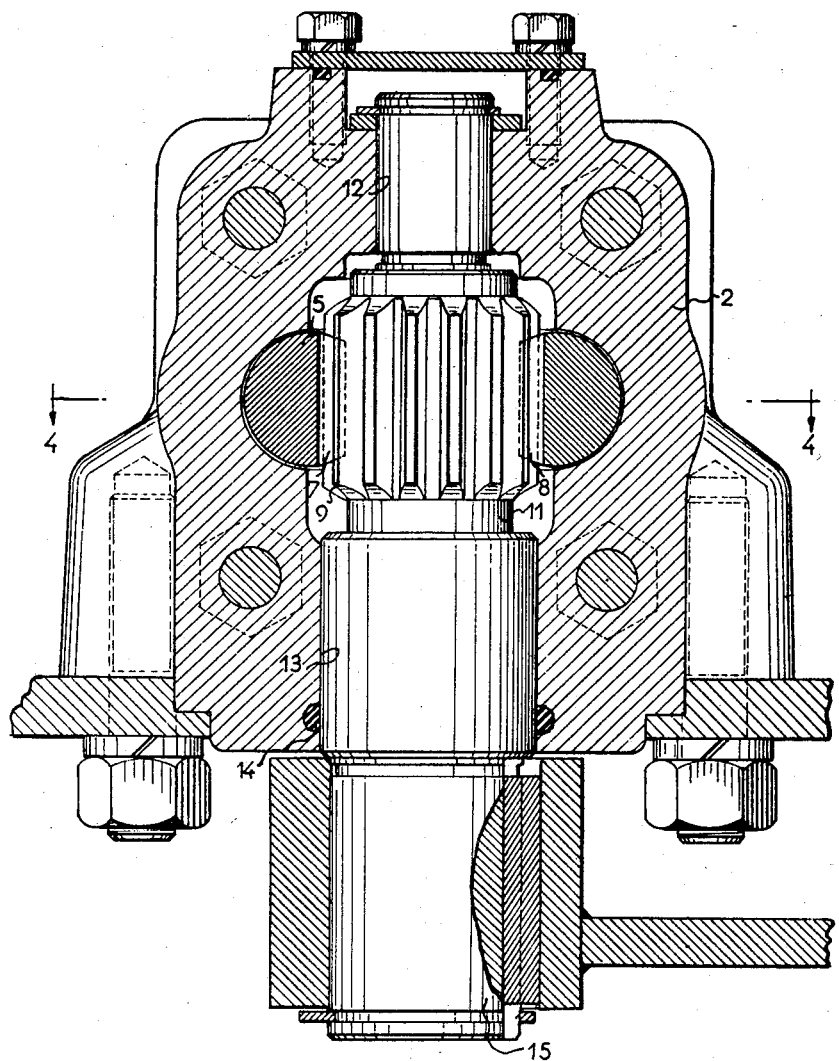
Fig. 2 is a cross-section of the engine taken through the rack and pinion means of Fig. 1.

However, since leaks may, in the long run, cause at least a partial filling of said free space with power fluid, and since temperature variations would be liable to cause an excessive pressure increase in said free space, the device is preferably completed by a valve adapted to let the pressure fluid contained in the free space flow out, if need be. In Fig. 1, said valve is indicated at 23; it is made of plastic material for instance, and is carried by a spring blade 24, and normally obturates a port 25 extending through the wall of the casing 2. Should the pressure inside the casing 2 reach a value higher than the strength of the spring 24, then the valve 23 is raised and it lets the fluid under pressure flow out. If, however, the pressure inside the casing 2 becomes lower than the atmospheric pressure, the valve 23 prevents any foreign matters from entering the casing.

Fig. 3 shows one embodiment of a hydraulic system housed within the block 1. This system corresponds to the one described in the aforesaid patent application. The cylinder 3 is fed through a conduit 27 controlled by a check valve 28 loaded by a spring 28a. The exhaust is ensured through conduits 29 and 53 connected to the reservoir (not shown) under the control of a valve 31 loaded by a spring 30.

In a similar manner, the cylinder 4 is fed through a conduit 32 controlled by a check valve 33 loaded by a spring 33a, and its exhaust is ensured by a conduit 34 and the conduit 53 is connected to the reservoir, under the control of a valve 35 loaded by a spring 37.

The conduit 27 is further controlled by a distributor 36, the sliding valve 38 of which is subjected to the action of the fluid pressure prevailing in the supply conduit 39. The sliding valve 38 carries a push rod 41 adapted to unseat the valve 35 before the sliding valve 38 has moved by a distance long enough to uncover the orifice 42 of the conduit 27.

In a similar manner, the conduit 32, which feeds cylinder 4, is further controlled by a distributor 44, the sliding valve 45 of which carries a push rod 46 adapted to unseat the valve 31 and to uncover the orifice 47 of the conduit 32, under the same conditions as hereinabove described in connection with the distributor 36.

Furthermore, both active compartments of the cylinders 3 and 4 are provided with overload release valves 48 and 49, respectively, loaded by springs 51 and 52, and adjusted at a pressure higher than the maximum operating pressure contemplated, but still limited to a value liable to eliminate any risk of over-pressure damaging the installation. Said over-pressure release valve opens into the conduit 53 which leads back to the reservoir.

The operation is very simple: in the absence of any fluid pressure in the installation, the four valves 28, 33, 31 and 35 rest on their seats and the liquid entrapped within the cylinders 3 and 4 holds the device under locked condition.

If it is then desired to move the movable structure, for instance in the direction of the arrow $f$ in Fig. 3, it merely suffices to feed pressure fluid into the inlet conduit 39. This fluid first moves the sliding valve 38, which opens the valve 35 and establishes a communication between the conduits 39 and 27; the fluid unseats the valve 28 and pushes the piston 6 of the cylinder 3 which, through the kinematic connection 9, causes movement of the piston 5 which is able to force back to the reservoir the liquid contained in the cylinder 4, through the conduit 34 and 52 since the valve 35 is open. After completion of the movement, the fluid which has caused said movement is entrapped within the cylinder 3 due to the closing of the valve 28, and so on.

In order to make it clear to what extent the arrangement according to the invention, leads to small overall dimensions, a numerical example will now be given.

For an engine capable of developing a torque of 50 m. kg., and operated under a pressure of 400 kg./cm.$^2$, use has been made of a square section block of 100 mm. x 100 mm. x 125 mm. associated with an aluminum casing having a length of 120 mm.

In a general manner, while in the above description, is disclosed what is deemed to be a practical and efficient embodiment of the invention, it should be well understood that it is not wished to be limited thereto as there might be changes made in the arrangement, disposition and form of the parts without departing from the principle of the present invention.

What is claimed is:

1. A fluid motor comprising a box, two pressure fluid cylinders in said box, two pistons each slidably mounted in one of said cylinders, a rotary shaft projecting at one end out of said box, transmission means interposed between said pistons and the inner part of said shaft to impart to the latter a reciprocating angular movement in response to alternate feeding of said cylinders with pressure fluid, control means to alternately admit pressure fluid in each one of said cylinders while evacuating fluid from the other, said box being entirely inclosed except for the hole accommodating said shaft projecting end and the respective ports through which said pressure fluid is introduced into said box and flows out therefrom, and an overload valve controlling a port through a wall of said box, for letting out any excess of pressure fluid while preventing any ingress of foreign material into said box.

2. A fluid pressure motor comprising a casing provided with a pinion chamber and two parallel cylindrical bores opening into said chamber at the same side thereof, said casing being made of two component parts secured to each other, namely: a block made of a material having a high mechanical strength and a porosity sufficiently low so as to make said block pressure fluid-tight, said bores being formed in said block, and a pinion housing made of a non-seizing material, a driven shaft journalled within said casing, a pinion coupled to said driven shaft and positioned within said chamber, one end of said shaft projecting out of said casing, two reciprocable pressure pistons, one of said pistons being reciprocable in one of said bores and the other of said pistons being reciprocable in the other of said bores, each of said pistons being in fluid-tight contact with its associated bore so as to define therewith a pressure chamber of variable volume, one end of each of said pistons being provided with a rack portion engaging said pinion, so that when one of said racks is moved with the corresponding piston in one direction said pinion will move the other rack and its corresponding piston in the opposite direction, the walls of said pinion housing forming slideways for guiding said rack portions, fluid inlet and outlet passages in said casing communicating with each pressure chamber, and valve means for controlling the flow of operating fluid through said inlet and outlet passages, said pistons having substantially equal dimensions so that they may be reciprocated in said pinion chamber without causing substantial volume variations thereof, said fluid pressure motor further including an overload valve controlling a port through a wall of said pinion chamber for letting out any excess of pressure fluid while preventing any ingress of foreign material into said pinion chamber.

References Cited in the file of this patent
UNITED STATES PATENTS

| | | |
|---|---|---|
| 560,332 | Tydeman | May 19, 1896 |
| 2,844,127 | Steiner | July 22, 1958 |

FOREIGN PATENTS

| | | |
|---|---|---|
| 648,744 | Thmig | Aug. 7, 1937 |